(12) United States Patent
Kontz

(10) Patent No.: US 7,743,500 B2
(45) Date of Patent: Jun. 29, 2010

(54) METHOD FOR MANUFACTURING AN EXHAUST GAS TREATMENT DEVICE

(75) Inventor: Markus Kontz, Saarbruecken (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 564 days.

(21) Appl. No.: 11/414,816

(22) Filed: May 1, 2006

(65) Prior Publication Data

US 2006/0265872 A1 Nov. 30, 2006

(30) Foreign Application Priority Data

May 11, 2005 (DE) .................. 10 2005 022 512

(51) Int. Cl.
B21D 51/16 (2006.01)
B23P 11/00 (2006.01)

(52) U.S. Cl. .................. 29/890; 29/520; 29/525; 29/505; 29/516

(58) Field of Classification Search .................. 29/890, 29/525, 463, 520, 509, 505, 516, 890.08, 29/840

See application file for complete search history.

(56) References Cited

U.S. PATENT DOCUMENTS

| | | | | |
|---|---|---|---|---|
| 3,841,839 A | * | 10/1974 | Wiley | 422/179 |
| 4,124,357 A | * | 11/1978 | Akimoto et al. | 422/181 |
| 4,148,120 A | | 4/1979 | Siebels | |
| 4,160,010 A | | 7/1979 | Ottle | |
| 4,179,520 A | * | 12/1979 | Barnish et al. | 514/538 |
| 4,179,521 A | * | 12/1979 | Barnish et al. | 514/538 |
| 4,185,117 A | * | 1/1980 | Barnish et al. | 514/620 |
| 4,519,120 A | | 5/1985 | Nonnenmann et al. | |
| 5,082,479 A | * | 1/1992 | Miller | 55/523 |
| 5,273,724 A | * | 12/1993 | Bos | 422/179 |
| 5,755,025 A | * | 5/1998 | Wirth et al. | 29/840 |
| 5,909,916 A | * | 6/1999 | Foster et al. | 29/890 |
| 5,953,817 A | * | 9/1999 | Watanabe et al. | 29/890 |
| 6,000,131 A | * | 12/1999 | Schmitt | 29/890 |
| 6,101,714 A | * | 8/2000 | Schmitt | 29/890 |
| 6,185,819 B1 | * | 2/2001 | Bauer et al. | 29/890 |

(Continued)

FOREIGN PATENT DOCUMENTS

DE 2312794 9/1974

(Continued)

*Primary Examiner*—David P Bryant
*Assistant Examiner*—Sarang Afzali
(74) *Attorney, Agent, or Firm*—Howard IP Law Group, PC

(57) ABSTRACT

A method for manufacturing an exhaust gas treatment device for an internal combustion engine comprises axially inserting an exhaust gas treatment cartridge into a casing, wherein the casing has an initial inside cross-section that is larger than an outside cross-section of the exhaust gas treatment cartridge. A funnel is axially inserted into an end region of the casing, wherein an outside cross-section of the funnel is smaller than the initial inside cross-section of the casing. The cross-section of the casing is subsequently reduced such that the casing ultimately has a first ultimate inside cross-section that is equal to the outside cross-section of the exhaust gas treatment cartridge in a region, in which the at least one exhaust gas treatment cartridge is arranged, and a second ultimate inside cross-section that is equal to the outside cross-section of the funnel in the respective end region, in which the respective funnel is arranged.

14 Claims, 1 Drawing Sheet

U.S. PATENT DOCUMENTS

| | | | |
|---|---|---|---|
| 6,381,843 B1 * | 5/2002 | Irie et al. | 29/890 |
| 6,405,437 B1 * | 6/2002 | Sussmilch et al. | 29/890.08 |
| 6,430,811 B1 * | 8/2002 | Ohashi et al. | 29/890 |
| 6,532,659 B1 * | 3/2003 | DeSousa et al. | 29/890 |
| 6,701,617 B2 * | 3/2004 | Li et al. | 29/890 |
| 6,954,988 B2 * | 10/2005 | Mayfield | 29/890 |
| 7,169,365 B2 * | 1/2007 | Lancaster et al. | 422/179 |
| 7,252,808 B2 * | 8/2007 | Tursky | 422/179 |
| 7,334,334 B2 * | 2/2008 | Lancaster et al. | 29/890 |
| 2003/0000088 A1 * | 1/2003 | Mayfield | 29/890 |

FOREIGN PATENT DOCUMENTS

| | | |
|---|---|---|
| DE | 2856030 | 6/1980 |
| DE | 19723939 | 12/1998 |
| DE | 10249675 | 5/2004 |
| EP | 1118749 | 7/2001 |

\* cited by examiner

METHOD FOR MANUFACTURING AN EXHAUST GAS TREATMENT DEVICE

FIELD OF THE INVENTION

The present invention pertains to a method for manufacturing an exhaust gas treatment device for an internal combustion engine, in particular, of a motor vehicle. The invention furthermore pertains to an exhaust gas treatment device manufactured in accordance with this method.

BACKGROUND OF THE INVENTION

Exhaust gas treatment devices such as catalytic converters and particle filters feature a casing, e.g., of cylindrical shape. At least one exhaust gas treatment cartridge is arranged in the casing, and a funnel is provided on at least one axial end of the casing. In the manufacture of the exhaust gas treatment device, it is possible, in principle, to initially insert the respective exhaust gas treatment cartridge that comprises, in particular, a particle filter element or a catalytic converter element axially into the casing that is open on both sides, wherein the inside cross-section of the casing initially is larger than an outside cross-section of the exhaust gas treatment cartridge. In order to fix the exhaust gas treatment cartridge within the casing in the finished exhaust gas treatment device, the cross-section of the casing can be reduced such that the inside cross-section is equal to the outside cross-section of the exhaust gas treatment cartridge along its entire length. This sizing process simultaneously makes it possible to compress a supporting mat of the exhaust gas treatment cartridge that is wrapped around the circumference of a cartridge body (particle filter element or catalytic converter element) of the exhaust gas treatment cartridge in order to generate a pre-stress. After this sizing process, a funnel is selected that corresponds to the ultimate inside cross-section of the casing after the reduction in cross-section, wherein the outside cross-section of the funnel should match the aforementioned ultimate cross-section as closely as possible, but be smaller than this ultimate cross-section in order to allow an unproblematic insertion of the funnel into the respective end region of the casing. The funnel is subsequently fixed on the casing in a gas-tight fashion, particularly with the aid of a circumferential welding seam.

Since the exhaust gas treatment cartridges and their cartridge bodies are subject to manufacturing-related dimensional tolerances, the reduction of the casing cross-section, i.e., the sizing process, results in varying ultimate cross-sections of the casing. Since the radial gap between the funnel and the casing should be as small as possible in order to easily produce the welding seam between the funnel and the casing, it is necessary to make available a relatively broad selection of funnels with different cross-sections. This is associated with a relatively high expenditure. In addition, the ultimate cross-section of the casing needs to be measured after the sizing process in order to select a suitable funnel. The measuring of the ultimate cross-section, as well as the selection of an appropriate funnel, is time-consuming and therefore cost-intensive.

SUMMARY OF THE INVENTION

The present invention generally provides improved embodiments of a manufacturing method of the initially cited type and of an exhaust gas treatment device manufactured in accordance with this method, both of which are characterized, in particular, in that their manufacturing costs are lowered.

The invention generally proposes to insert the respective funnel into the end of the casing before its cross-section is reduced, and that the inside cross-section of the casing is reduced to the outside cross-section of the funnel in the end region, into which the respective funnel is inserted. Due to these measures, the respective funnel is practically arranged in the casing without any gaps in the radial direction after the reduction in cross-section, such that the funnel can be fixed on the casing in a very simple and, in particular, automated fashion. In addition, it is no longer necessary to measure the inside cross-section of the casing after the sizing process and to select an appropriate funnel. Furthermore, the requirement of making available different funnels is eliminated. The cost advantages resulting thereof are quite evident.

According to one preferred embodiment, the reduction in cross-section can also be realized such that the casing subsequently has a first ultimate inside cross-section in the region of the at least one exhaust gas treatment cartridge and a second ultimate inside cross-section in the region of the respective funnel, wherein the second ultimate inside cross-section is smaller or larger than the first ultimate inside cross-section. In other words, the cross-section of the casing may be reduced to different degrees in different axial sections of the casing. This makes it possible, in particular, to choose the dimensions of the funnels independently of the dimensions of the exhaust gas treatment cartridges. For example, a standard funnel can be used for different exhaust gas treatment devices that can be distinguished in that they feature different exhaust gas treatment cartridges.

It goes without saying that the aforementioned characteristics, as well as the characteristics disclosed below, may also be utilized in combinations other than the respectively described combinations or individually without deviating from the scope of the present invention.

Preferred embodiments of the invention are illustrated in the figures and described in greater detail below, wherein identical or similar or functionally identical components are identified by the same reference symbols.

DETAILED DESCRIPTION OF THE PREFERRED EMBODIMENTS

Figure 1:
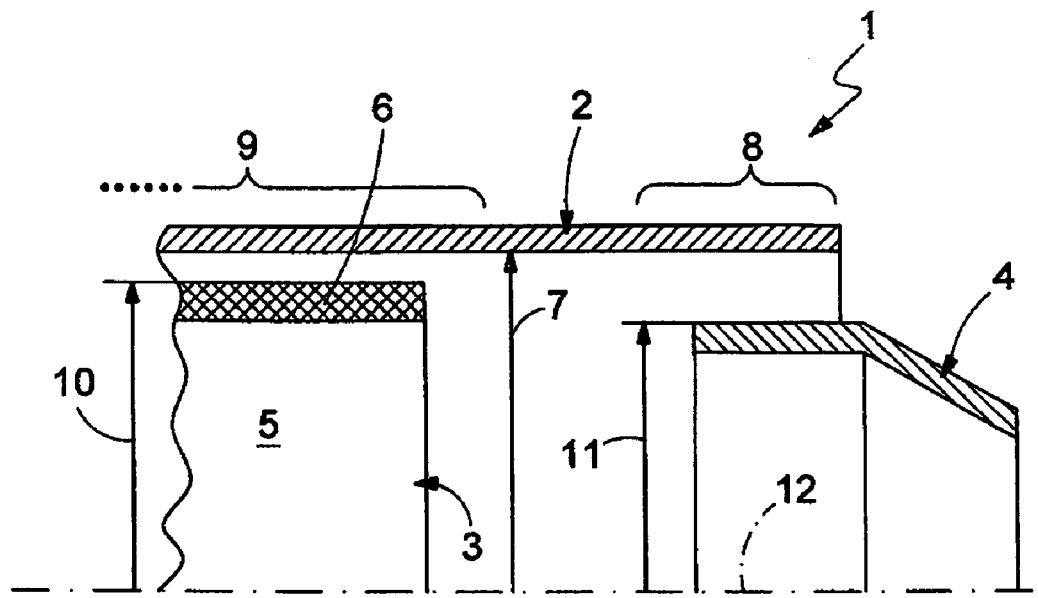
FIG. 1 illustrates a schematic longitudinal section through part of an exhaust gas treatment device before the reduction in cross-section.
Figure 2:
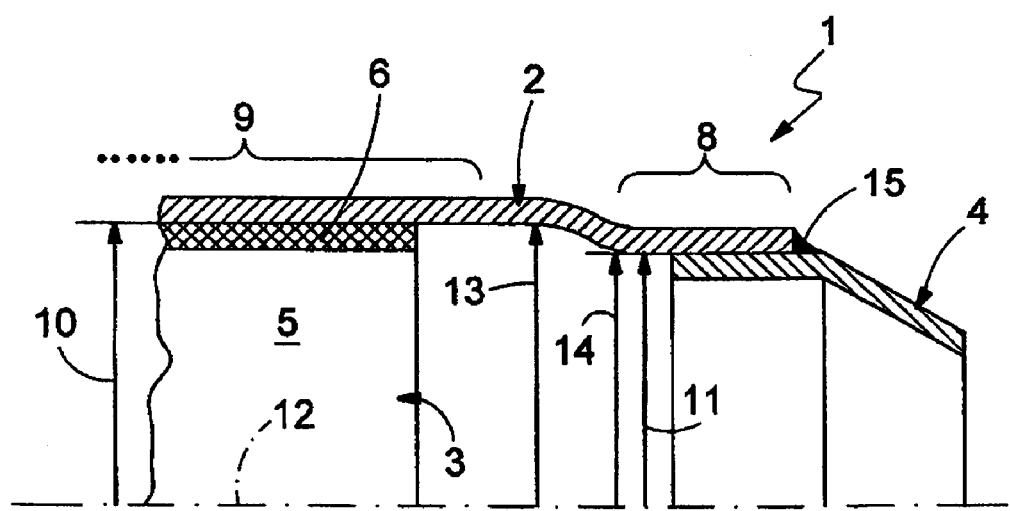
FIG. 2 illustrates a longitudinal section analogous to FIG. 1, however, after the reduction in cross-section.

According to FIGS. 1 and 2, an exhaust gas treatment device 1' (initial state according to FIG. 1) or 1 (ultimate state according to FIG. 2) is composed of a casing 2, at least one exhaust gas treatment cartridge 3 and at least one funnel 4. The exhaust gas treatment cartridge 3 preferably includes a cartridge body 5 as well as a supporting mat 6 that is wrapped around the circumference of the cartridge body 5. The cartridge body 5 includes, for example, a catalytic converter element or of a particle filter element. Accordingly, the exhaust gas treatment device 1 preferably includes a particle filter or a catalytic converter. The exhaust gas treatment device 1 is designed for being installed in the exhaust system of an internal combustion engine, preferably of a motor vehicle.

The new exhaust gas treatment device 1 is manufactured in accordance with the inventive method described below.

The individual components of the exhaust gas treatment device 1' are initially manufactured separately. The casing 2 is realized in the form of a tubular or cylindrical hollow body that is open on at least one side and preferably manufactured of sheet metal. In the initial state shown in FIG. 1, the casing 2 has an initial inside cross-section 7 that is preferably constant at least in an axial end region 8 that comprises the one open side of the casing 2 and extends into a receptacle region 9, in which the at least one exhaust gas treatment cartridge 3 is arranged within the casing 2 after the completion of the exhaust gas treatment device 1.

The cartridge body 5 may include a component that is susceptible to stress. Ceramic materials are preferably used for this purpose. The cartridge body 5 usually is composed of a ceramic monolith. The supporting mat 6 may comprise a conventional temperature-resistant support material such as, for example, a fiber mat. The cartridge body 5 and its wrapping in the form of a supporting mat 6 form the exhaust gas treatment cartridge 3 that has an outside cross-section 10 in the initial state shown in FIG. 1. The funnel 4 preferably also is composed of a sheet metal part. The funnel 4 has an outside cross-section 11 that can be chosen, in principle, independently of the outside cross-section 10 of the exhaust gas treatment cartridge 3. However, it is preferred that the outside funnel cross-section 11 is—as shown—smaller than the outside cross-section 10 of the exhaust gas treatment cartridge. In a first production step, the exhaust gas treatment cartridge 3 is axially inserted into the casing 2 until it is situated in the receptacle region 9, and the funnel 4 is axially inserted into the end region 8. This is achieved by realizing the initial inside cross-section 7 of the casing 2 larger than the outside cross-sections 10, 11 of the exhaust gas treatment cartridge 3 and of the funnel 4. This results in the initial state shown in FIG. 1.

A sizing process carried out after the insertion of the exhaust gas treatment cartridges 3 and the funnels 4 serves for reducing the cross-section of the casing 2. This reduction in cross-section can be achieved, for example, by rolling the casing 2 about its longitudinal axis 12 or longitudinal center line, wherein the casing is simultaneously subjected to a radial compressive load. The inside and outside cross-sections of the casing 2 can be reduced in this fashion. It would also be possible to realize the reduction in cross-section by radially compressing the casing 2, wherein circumferentially distributed pressure segments engage on and radially compress the casing 2. It would also be conceivable, in principle, to utilize other deformation methods for realizing the desired reduction in cross-section.

FIG. 2 shows the state after the reduction in cross-section. According to FIG. 2, the reduction in cross-section in the method according to the invention is carried out, in particular, such that the casing 2 subsequently has a first ultimate inside cross-section 13 in the receptacle region 9, in which the respective exhaust gas treatment cartridge 3 is situated, wherein this first ultimate inside cross-section is equal to the outside cross-section 10 of the exhaust gas treatment cartridge 3. The reduction in cross-section of the casing 2 is also carried out such that the casing 2 subsequently has a second ultimate inside cross-section 14 in the end region 8, in which the funnel 4 is situated, wherein the second ultimate inside cross-section is equal to the outside cross-section 11 of the funnel 4. Accordingly, the funnel 4 is axially inserted into the end region 8 of the casing 2 without any gaps in the radial direction in the ultimate state shown in FIG. 2. The reduction in the cross-section of the casing 2 in the end region 8 is carried out, in particular, such that a two-dimensional radial contact between the casing 2 and the funnel 4 is subsequently produced over the entire circumference.

In order to fix the casing 2 relative to the funnel 4 and to produce a gas-tight connection between these two components, the funnel 4 can be attached to the casing 2, for example, by means of a welding seam 15 that continuously extends over the entire circumference. It would also be possible to solder the funnel 4 to the casing 2.

The sizing process, in which the cross-section is reduced in the receptacle region 9, is required for fixing the exhaust gas treatment cartridge 3 in the casing 2 in a sufficiently secure fashion. Since the cartridge bodies 5 and/or the supporting mats 6 are subject to relatively broad manufacturing-related dimensional tolerances, the initial inside cross-section 7 of the casing 2 may be significantly larger than the outside cross-section 10 of the exhaust gas treatment cartridge 3. During the sizing process, the cross-section is reduced, in particular, in such a way that a radial pre-stress is generated between the exhaust gas treatment cartridge 3 and the casing 2 in the ultimate state according to FIG. 2. This is achieved in that the supporting mat 6 is compressed when the cross-section of the casing 2 is reduced. Consequently, the reduction in the cross-section of the casing 2 may simultaneously lead to a corresponding reduction of the outside cross-section 10 of the exhaust gas treatment cartridge 3. For example, the cross-section is reduced to a nominal cross-section of the casing 2, at which it is empirically ensured that a sufficient pre-stress is generated under all occurring tolerances of the exhaust gas treatment cartridge 3. The desired nominal cross-section may be the ultimate inside cross-section 13 or an externally measured ultimate cross-section of the casing 2.

In the end region 8, the cross-section is reduced, as mentioned above, until the casing 2 radially contacts the funnel 4. In this case, it would also be possible, in principle, to reduce the cross-section in the end region 8 to a nominal cross-section, at which a tight, two-dimensional contact over the entire circumference is ensured under all occurring dimensional tolerances of the funnels 4. In this respect, it would also be conceivable, in principle, to simultaneously reduce the outside cross-section 11 of the funnel 4 during the reduction in cross-section. In this case, the inside cross-section or the outside cross-section of the casing 2 may serve as the nominal cross-section.

The funnel 4 and the exhaust gas treatment cartridge 3 may be chosen, in principle, independently of their outside cross-sections 10, 11. In this respect, it is preferred, however, to choose the respective components as in the embodiment shown, in which the outside funnel cross-section 11 is smaller than the outside cross-section 10 of the exhaust gas treatment cartridge 3 before the reduction in cross-section and after the reduction in cross-section. However, it would also be conceivable, in principle, to realize embodiments, in which the ultimate funnel cross-section 11 is approximately equal to or even larger than the outside cross-section 10 of the exhaust gas treatment cartridge 3 before the reduction in cross-section. It would even be possible to realize embodiments, in which the outside funnel cross-section 11 is larger than the outside cross-section 10 of the exhaust gas treatment cartridge 3 after the reduction in cross-section. In all embodiments described so far, the first ultimate cross-section 13 of the casing 2 in the receptacle region 9 and the second ultimate cross-section 14 of the casing 2 in the end section 8 have different sizes after the reduction in cross-section. It is particularly advantageous if the reduction in cross-section in the receptacle region 9 for fixing the exhaust gas treatment cartridge 3 and the reduction in cross-section in the end region 8 for adapting the casing 2 to the funnel 4 are carried out with the same tool and in the same production step. This is particularly economical because only one process is required in order to realize a reduction in cross-section that, however, is carried out to different degrees in the aforementioned longitudinal sections of the casing 2.

Furthermore, it would be possible, in principle, to realize an embodiment, in which the funnel 4 is manufactured within its manufacturing tolerances such that its outside cross-section 11 approximately corresponds to that particular outside cross-section 10 of the exhaust gas treatment cartridge 3 that the exhaust gas treatment cartridge 3 should have after the reduction in cross-section, i.e., after the sizing process. In such an embodiment, the first ultimate cross-section 13 may be equal to the second ultimate cross-section 14 after the reduction in cross-section.

What is claimed is:

1. A method for manufacturing an exhaust gas treatment device for an internal combustion engine of a motor vehicle, comprising the steps of:
    axially inserting at least one exhaust gas treatment cartridge into a cylindrical casing that is open on at least one side, wherein the casing has an initial inside cross-section larger than an outside cross-section of the exhaust gas treatment cartridge;
    axially inserting at least one funnel into an axial end region of the casing, the at least one funnel comprising a first end region of a first outside cross-section and a second end region having a tapered outside cross-section, the first end region of the at least one funnel being proximal to the at least one exhaust gas treatment cartridge, and wherein the first outside cross-section of the first end region of the funnel is smaller than the initial inside cross-section of the casing; and,
    reducing the cross-section of the casing such that the casing subsequently has a first ultimate inside cross-section equal to the outside cross-section of the exhaust gas treatment cartridge in a first region of the casing in which the at least one exhaust gas treatment cartridge is arranged, and a second ultimate inside cross-section equal to the first outside cross-section of the first end region of the funnel in a second end region of the casing in which the funnel is arranged, wherein both of the outside cross-section of the at least one exhaust gas treatment cartridge and the first outside cross-section of the first end region of the at least one funnel are reduced during the reducing step.

2. The method according to claim 1, wherein the at least one exhaust gas treatment cartridge comprises at least one of a catalytic converter element and a particle filter element.

3. The method according to claim 2, wherein the catalytic converter element or the particle filter element comprises a ceramic monolith.

4. The method according to claim 3, wherein at least one of the casing and the at least one funnel comprises sheet metal.

5. The method according to claim 1, wherein:
    the first outside cross-section of the first end region of the funnel is smaller or larger than the outside cross-section of the at least one exhaust gas treatment cartridge before said reducing; and
    the first outside cross-section of the first end region of the funnel is equal to or smaller or larger than the outside cross-section of the at least one exhaust gas treatment cartridge after the reduction in cross-section.

6. The method according to claim 1, wherein the second ultimate inside cross-section of the casing is smaller or larger than the first ultimate inside cross-section of the casing in the second region of the casing after the reducing.

7. The method according to claim 1, further comprising the step of: radially clamping at least one of the at least one exhaust gas treatment cartridge and at least one funnel in position during the reducing.

8. The method according to claim 1, wherein the at least one exhaust gas treatment cartridge comprises a cartridge body and a supporting mat that is circumferentially wrapped around the cartridge body, wherein the supporting mat is radially compressed during the reducing.

9. The method according to claim 1, further comprising the step of at least one of welding and soldering the first end region of the at least one funnel to the casing after the reducing.

10. The method according to claim 1, wherein the reducing in cross-section comprises rolling the casing about its longitudinal axis under a radial compressive load.

11. The method according to claim 1, wherein the reducing in cross-section comprises radially compressing the casing using circumferentially distributed pressure segments.

12. The method of claim 1, further comprising the step of maintaining an axial separation between the at least one exhaust gas treatment cartridge and the first end region of the at least one funnel.

13. The method of claim 1, wherein the second end region is connected to the first end region, and wherein at least a portion of the tapered outside cross-section of the second end region extends out of the casing.

14. The method of claim 1, wherein the tapered outside cross-section of the second end region has a progressively decreasing outside cross-section in the direction extending outward from the casing.

* * * * *